(12) United States Patent
Delegue et al.

(10) Patent No.: US 7,050,946 B2
(45) Date of Patent: May 23, 2006

(54) DEVICE FOR AND A METHOD OF MONITORING SERVICE DATA FOR AUTOMATED TRAFFIC ENGINEERING IN A COMMUNICATIONS NETWORK

(75) Inventors: Gérard Delegue, Cachan (FR); Stéphane Betge-Brezetz, Paris (FR); Olivier Martinot, Draveil (FR); Emmanuel Marilly, Antony (FR)

(73) Assignee: Alcatel, Paris (FR)

( * ) Notice: Subject to any disclaimer, the term of this patent is extended or adjusted under 35 U.S.C. 154(b) by 15 days.

(21) Appl. No.: 10/443,037

(22) Filed: May 22, 2003

(65) Prior Publication Data

US 2003/0220769 A1    Nov. 27, 2003

(30) Foreign Application Priority Data

May 23, 2002    (FR) .................................. 02 06286

(51) Int. Cl.
*G06F 15/00* (2006.01)
*H04L 12/24* (2006.01)
*G05B 15/00* (2006.01)

(52) U.S. Cl. ............................ 702/188; 340/3.1; 700/9
(58) Field of Classification Search ........ 702/121–123, 702/182–188; 340/3.1, 3.42, 3.43, 3.44, 340/825.79, 7.29; 700/9, 10, 3, 11, 1; 714/4, 714/43, 46, 47
See application file for complete search history.

(56) References Cited

U.S. PATENT DOCUMENTS

| | | | | |
|---|---|---|---|---|
| 5,488,715 A | * | 1/1996 | Wainwright | .................... 714/4 |
| 5,638,431 A | * | 6/1997 | Everett et al. | ......... 379/114.28 |
| 5,974,237 A | * | 10/1999 | Shurmer et al. | ............ 709/224 |
| 5,974,457 A | * | 10/1999 | Waclawsky et al. | ........ 709/224 |
| 6,671,724 B1 | * | 12/2003 | Pandya et al. | ............... 709/224 |
| 2002/0143926 A1 | * | 10/2002 | Maltz et al. | ................ 709/224 |
| 2003/0069952 A1 | * | 4/2003 | Tams et al. | ................. 709/223 |

FOREIGN PATENT DOCUMENTS

| | | |
|---|---|---|
| WO | WO 0072183 A3 | 11/2000 |
| WO | WO 0074314 A2 | 12/2000 |
| WO | WO 0161492 A1 | 8/2001 |

* cited by examiner

*Primary Examiner*—Marc S. Hoff
*Assistant Examiner*—Manuel L. Barbee
(74) *Attorney, Agent, or Firm*—Sughrue Mion, PLLC

(57) ABSTRACT

A device for monitoring service data for controlling traffic engineering modules (11, 12) and delivered by management modules (7) of a communications network. The device comprises i) a memory (9) for storing rules each defined by at least one condition representative of an event in the network associated with one of the traffic engineering modules (11, 12) and at least one action representative of at least one command to be executed by the associated module and ii) monitoring means (3) adapted, on receiving service data designating an event, to extract from the memory (9) at least one of the rules corresponding to the event and to deliver each command representative of the action associated with the condition representative of the event to the traffic engineering module (11, 12) associated with that event in the extracted rule.

5 Claims, 1 Drawing Sheet

DEVICE FOR AND A METHOD OF MONITORING SERVICE DATA FOR AUTOMATED TRAFFIC ENGINEERING IN A COMMUNICATIONS NETWORK

The field of the invention is that of communications between terminals in a network, and to be more specific the field of monitoring the exchange of data between terminals.

BACKGROUND OF THE INVENTION

Because network equipment is continually evolving, and because of the number and variety of technologies that are employed by the equipment and the number and variety of services that are offered to customers using the networks and the equipment, network operators are increasingly confronted with priority and level of service management problems. There is even more of a problem if a network operator enters into Service Level Agreements (SLA) with its customers that include Service Level Specifications (SLS).

Several types of integrated network management tools, also known as Operation Support Systems (OSS), intended to facilitate the task of operators have been proposed. They include quality of service management modules that deliver alarm messages (for example SNMP TRAP messages) if a problem (or an event) that has occurred or is likely to occur and that impacts on the network equipment or network performance is detected. An alarm message is usually communicated to a network manager, who determines actions likely to solve the problem that is giving rise to the alarm message. These tools also include traffic engineering modules that execute commands corresponding to actions determined by a network manager.

The solution described in the patent application WO 00/74314 is a mechanism for managing problems within a network with a view to providing solutions to them. The types of solution cited (on page 2) include problem reporting, problem notification, service level agreement (SLA) violations, reconfiguration of the service affected by the problem detected, etc. The solution is focused on the service aspect and takes no account of the behavior of the network as such (the data streams transmitted, the distribution of the load on the network elements, etc.).

Thus it is not a matter of interfacing this mechanism to a traffic engineering module.

Similarly, the patent application WO 00/72183 is concerned with the service management level and is silent on the problems of network management as such. Although that document mentions the possibility of reconfiguration, that is triggered by an SLA violation, not by alarms from the network or the status of the network.

There are a few tools enabling a network manager to view some alarms, and thus providing management aids. However, there is no decision making aid capable of proposing actions on traffic engineering modules. The manager must therefore analyze all the alarm messages delivered by various quality of service management modules, which usually have different formats, then classify them in priority order, then decide the actions to be taken, on the basis of the current traffic, and finally generate commands, usually having different formats, so that the traffic engineering modules can undertake those actions.

The manager must therefore be capable of i) analyzing large quantities of information in time periods that are often short, ii) interpreting all the events reported by the various management modules, and iii) configuring all the available traffic engineering modules, and must consequently be familiar with all of the commands that these modules use. These operations divert the manager from his main function, which is solving problems associated with network events. What is more, these operations are often time-consuming and repetitive.

From another point of view, integrating a new traffic engineering module into a group of OSS components is a complex task in that, firstly, the programming language interfaces (API) used so that the different software entities can coexist are frequently mutually incompatible and, secondly, the events of interest to this kind of module generally originate from many heterogeneous software tools, with the result that it is necessary to take account of all traffic load modifications and forecasts and constraints associated with the network equipment (for example an interface that is out of service) or network capacity modifications.

OBJECTS AND SUMMARY OF THE INVENTION

Thus an object of the invention is to remedy some or all of the above-mentioned drawbacks.

To this end the invention proposes a device for monitoring service data for controlling traffic engineering modules and delivered by management modules of a communications network.

The device is characterized in that it comprises i) a memory for storing rules each defined by one or more conditions representative of an event in the network associated with one of said traffic engineering modules and one or more actions representative of one or more commands to be executed by said associated module and ii) monitoring means adapted, on receiving service data designating an event, to extract from said memory one or more of the rules corresponding to said event and to deliver each command representative of an action associated with a condition representative of said event to said traffic engineering module associated with that event in the extracted rule.

The operator can then define rules based on actions independent of the implementation of the various traffic engineering modules of his network, so the network manager no longer needs to be familiar with the commands specific to each traffic engineering module and/or the formats specific to the various types of event delivered by the various quality of service management modules of the network. The manager can therefore devote himself entirely to solving problems that arise in the network, or problems that are liable to arise.

The working of the device can be entirely automated (in which case all actions are chosen and effected by the monitoring means without intervention by the manager) or only partially automated (in which case some actions are chosen and effected by the monitoring means without intervention by the manager and other actions are chosen by the monitoring means and effected after they have been authorized by the manager). In the semi-automated situation, the rules are preferably associated, in the memory, with a two-state validation parameter, the two states respectively corresponding to validation with and without authorization by the manager (or the operator), and the monitoring means advantageously include interface means adapted, on receiving an action to be executed that is associated with validation subject to authorization, to send the server of the operator the action and a request for authorization to execute that action, so that on receiving authorization or refusal of authorization they can authorize or prohibit delivery to the traffic engineering module concerned of commands associated with the action envisaged.

The device of the invention may have many complementary features separately and/or in combination, and in particular:

monitoring means including first converter means adapted to convert said service data delivered by said management modules with different formats into events conforming to a main format;

monitoring means including second converter means adapted to convert each action associated with an extracted rule into command(s) that can be interpreted by the traffic engineering module associated with said action; in this case, it is advantageous if the second converter means include plug-in programs for converting actions into commands;

monitoring means including configuration means coupled to the memory, to the interface means, and to the first and second converter means, and adapted, on receiving an event conforming to the main format, to extract from the memory each rule associated with said event, in order to communicate to said second converter means each action associated with each extracted rule, where applicable after a request for authorization via said interface means;

a memory (or database) coupled to the server of the operator (or manager) of the network to receive the rules (commands/actions); this memory can be integrated into the monitoring means.

The above kind of monitoring device may advantageously be integrated into an integrated network management tool (or operation support system (OSS)).

The invention also provides a method of monitoring service data for controlling traffic engineering modules and delivered by management modules of a communications network.

The method consists in, firstly, providing rules each defined by one or more conditions representative of an event in the network associated with one of the traffic engineering modules and one or more actions representative of one or more commands to be executed by the associated module and, secondly, receiving service data designating an event, selecting one or more of the rules corresponding to the event, and delivering each command representative of the action associated with the condition representative of the event to the traffic engineering module associated with the event in the selected rule.

The method of the invention may have many complementary features separately and/or in combination, and in particular:

the rules (commands/actions) can be associated with a validation parameter adapted to assume a first state corresponding to validation without authorization by an operator or a second state corresponding to validation subject to authorization by the operator; in this case, on receiving an action to be executed associated with a validation parameter in a second state, the operator is sent the action and a request for authorization to execute it and, on receiving an authorization or a refusal of authorization, delivery of the commands associated with the action to the traffic engineering module concerned is authorized or refused;

service data delivered by the management module with different formats is converted into events conforming to a single main format;

each action associated with an extracted rule is preferably converted into one or more commands that can be interpreted by the associated traffic engineering module.

The invention can be implemented in any type of public or private communications network, and in particular in Internet Protocol (IP), ATM and Frame Relay networks. Also, the invention can be used to monitor many services, and in particular IP VPN, high bit rate, web, multimedia and 3G services.

BRIEF DESCRIPTION OF THE DRAWING

Other features and advantages of the invention become apparent in the light of the following detailed description and the single accompanying FIGURE, which is a diagram showing one embodiment of a device of the invention. The FIGURE is, for the most part, definitive in character. Consequently, not only does it contribute to describing the invention, but it may also contribute to defining it, where appropriate.

MORE DETAILED DESCRIPTION

Figure 1:
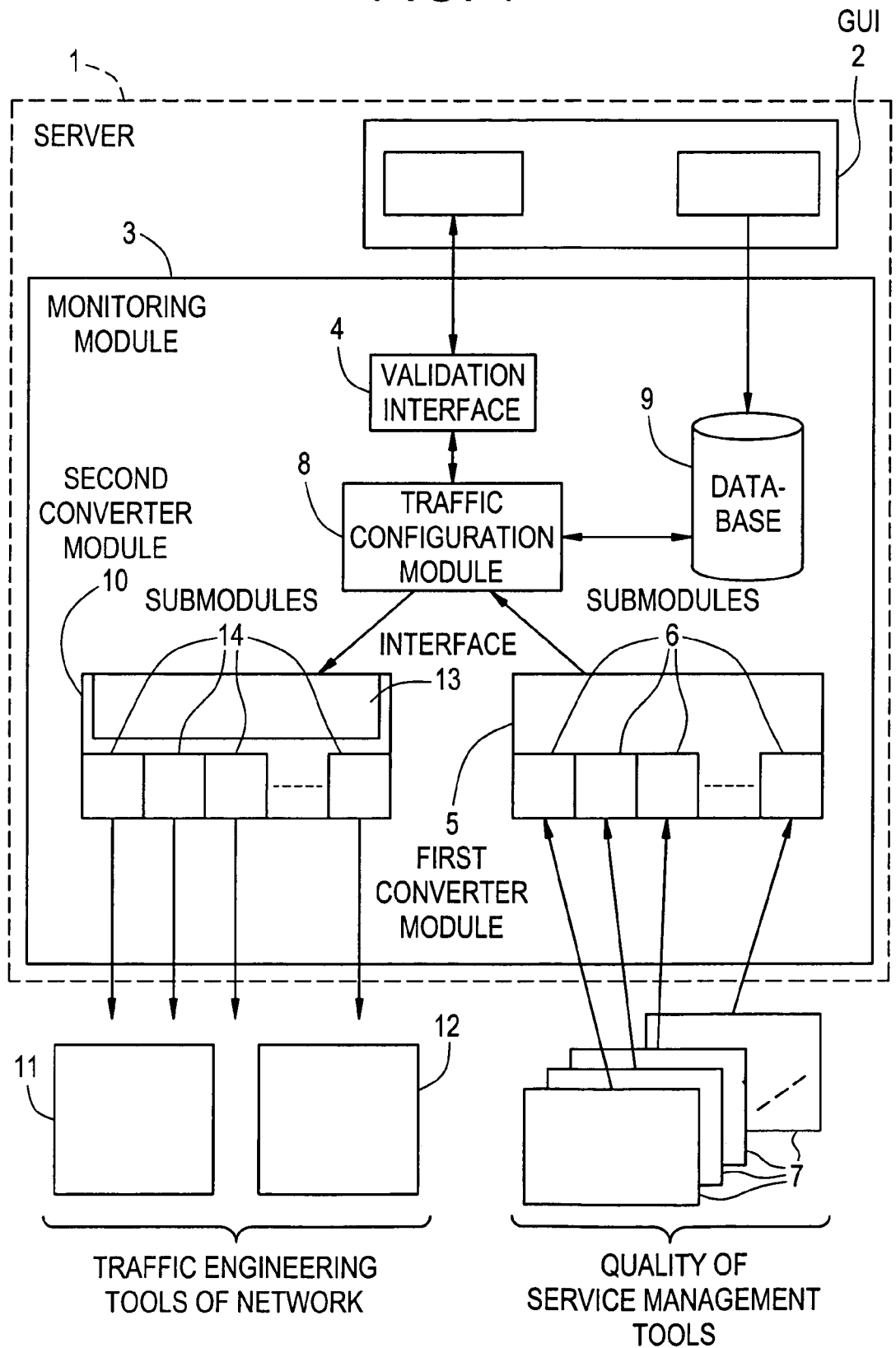

The device of the invention is intended to be installed at the heart of a communications network to monitor service data concerning data streams exchanged between customer terminals connected to the network. The following description considers by way of non-limiting example the Internet, which is a public network in which data is exchanged in accordance with the Internet Protocol (IP). However, it could be a private network, of the Intranet type, or a plurality of interconnected public and/or private networks. Moreover, the following description considers that at least some of the customers of the network have entered into Service Level Agreements (SLA) with the operator, with technical aspects defined by Service Level Specifications (SLS).

The device is preferably installed in a server 1 controlled by a network manager of the operator via a Graphical User Interface (GUI) 2. It is even more preferable for the monitoring device of the invention to be integrated into a management tool (or Operation Support System (OSS)) integrated into the network.

In the example illustrated, the device essentially comprises a monitoring module 3 connected in particular to the Graphical User Interface 2 of the server 1 via a validation interface 4 (see below).

The monitoring module 3 includes, firstly, a first converter module 5 comprising a plurality of sub-modules 6 each fed by one of the quality of service management tools (modules) 7 of the network.

The management tools 7 deliver data representative of the performance of the network, for example, or one or more aspects thereof, together with alarm messages signaling problems at the network equipment level. Some of these alarm messages are representative of an SLS (or SLA) violation that has already occurred in the network. The performance data includes the bandwidth used and data stream measurements, for example, and the alarm messages stem from information sent by a router following a routing error or by an interface following a malfunction, for example.

Some management tools 7 can also track the evolution of the service data to deliver predictive alarm messages, in particular if it is liable to lead to the violation of a Service Level Specification (SLS violation), or more generally to a potential problem in the network. Predictive analysis uses forecasting algorithms fed with successive values of the service data received in a selected time interval.

The person skilled in the art is entirely familiar with all these quality of service management tools 7, which form no part of the invention as such, and for this reason are not described here.

The service data defines events representative of problems that have already arisen or are liable to arise and which therefore must be analyzed as quickly as possible to prevent the situation deteriorating. The various management tools 7 generally deliver them with different formats. In other words, these events reaching the first converter module 5 can be described as heterogeneous.

Each sub-module 6 of the converter module 5 consequently has to convert the heterogeneous events coming from a management tool 7 with a format specific to that tool into a homogeneous event having a format called the main format.

These homogeneous events are communicated to a traffic configuration module 8 from the monitoring module 3, which is also connected to a database 9, to the validation interface 4, and to a second converter module 10, which is in turn coupled to various traffic engineering tools 11 and 12 of the network.

These traffic engineering tools, which may be centralized tools (11) or tools (12) distributed between network elements, are adapted to execute specific commands defined by actions adapted to solve problems that have arisen or to prevent potential problems that have been predicted, in respect of which an event has been generated by one of the management tools 7. These specific commands include determination of a Label Switch Path (LSP) or global optimization of the LSPs of a network.

The person skilled in the art is entirely familiar with all these traffic engineering tools 11 and 12, which form no part of the invention as such, and for this reason are not described here.

The database 9 stores a multiplicity of rules each defined by at least one condition and at least one action. To be more specific, each condition is representative of a listed event that can arise in the network (for example, a traffic overload, a forecasted overload on a connection, or an equipment alarm) and to which corresponds an action representative of specific commands that can be executed by one of the traffic engineering tools 11 and 12.

The conditions are stored in the database 9 in the main format, i.e. independently of the formats of the various management tools 7 that generate them. They can take into account technical specifications included in SLS. Moreover, the actions are also stored in the database 9 in the main format, i.e. independently of the formats of the various engineering tools 11 and 12 that have to execute them. The action is therefore not of a proprietary type, such as a Command Line Interface (CLI) command or an SNMP request. In other words, execution of the actions is independent of the main format of the rules. Thus, the same action is executed differently according to the type of traffic engineering tool to which it is addressed.

Each rule is preferably stored in the database 9 in corresponding relationship to each condition and each action associated with it. To be more precise, a rule generally consists of a set of conditions and a set of actions, the same condition can be used by more than one rule, and the same action can be executed subject to different conditions.

The rules can therefore take one of the following forms:

Rule 1="if condition 1 is true and condition 2 is true then execute action 1"

Rule 2="if condition 1 is true and condition 3 is true then execute action 2"

In a first example, a first condition can be stored in the database 9 in the form: condition 1="interface xy defective". This first condition can be associated with the action: action 1="reconfigure LSPs zt without using the defective interface xy". This condition and this action define, for example, the rule: rule 1="if condition 1 is true then execute action 1".

In a second example, a second condition can be stored in the database 9 in the form: condition 2="the bandwidth used by the interface z is greater than 50 Mbit/s". This second condition can be associated with the action: action 2="optimize the network globally". This condition and this action define, for example, the rule: rule 2="if condition 2 is true then execute action 2".

The database 9 is preferably coupled to the graphical user interface 2 of the server 1, so that the network manager can at anytime, and dynamically, integrate a new rule, condition or action, modify an old rule, condition or action, or delete a rule, condition or action that is no longer useful. This is made particularly simple by the format used to define the rules, conditions and actions.

The rules stored in the database 9 can be associated with a validation parameter that can take two states: a first state corresponds to automatic validation requiring no authorization by the manager, and a second state corresponds to validation subject to prior authorization by the manager.

In this case, if the first converter module 5 receives an event with a heterogeneous format, it converts it to the homogeneous main format and then sends it to the configuration module 8, which then extracts from the database 9 the rule(s), condition(s) and action(s) that correspond to the event, for example after consulting a table listing the correspondences between the various homogeneous events and the condition(s) corresponding to them in the database. The configuration module 8 then determines the state of the validation parameter associated with the elements extracted from the database 9.

If that state is the first state, it sends the action associated with the extracted rule to the second converter module 10 with coordinates designating the engineering tool 11 or 12 that is to execute it.

On the other hand, if that state is the second state, it sends the action associated with the extracted rule to the validation interface 4, where applicable with coordinates designating the engineering tool 11 or 12 that is to execute the action, in order for the latter to communicate them to the graphical user interface 2 of the server 1 with a request for validation (or authorization). If the manager does not agree with the chosen action, he sends a refusal of authorization to the validation interface 4 via the graphical user interface 2, which terminates the processing by the device. The manager can then intervene directly on the traffic engineering tool, after determining for himself the commands to be executed. On the other hand, if the manager agrees with the chosen action, he sends an authorization to the validation interface 4 via the graphical user interface 2. The validation interface 4 then sends the authorization to the configuration module 8, after which the module 8 sends the action associated with the extracted rule to the second converter module 10, with coordinates designating the engineering tool 11 or 12 that is to execute it.

The network manager can preferably modify the state of the validation parameter associated with a chosen rule via the graphical user interface 2.

Of course, the validation parameter can be dispensed with, in which case all actions are validated either automatically, without authorization by the manager, or subject to authorization by the manager.

The actions reaching the second converter module 10 that have been validated automatically or subject to authorization by the manager are then converted so that they can be interpreted and executed by the selected traffic engineering tool 11 or 12.

To this end, the second converter module 10 includes an interface 13 coupled to a plurality of sub-modules 14 each of which is coupled to one of the traffic engineering tools 11 and 12 and adapted to convert the selected and validated action that it receives into one or more commands and/or requests with the format specific to its traffic engineering tool. Consequently, it can include a table listing the correspondences between specific actions and sets of commands, for example of the CLI type, and/or requests, for example of the SNMP type, suitable for the engineering tool that has to execute them. It can instead include one or more plug-in files suited to action conversion (other action conversion modes can be envisaged: CORBA, RMI, ASCII files, Q3 protocol, etc.). Also, each sub-module 14 is adapted to deliver its sets of commands and/or requests using the syntax specific to the traffic engineering tool 11 or 12 to which it is coupled.

The interface 13 directs each action to be executed to the sub-module 14 coupled to the traffic engineering tool 11 or 12 designated by the coordinates that it has received from the configuration module 8.

The first and second converter modules 5 and 10 are preferably dynamically configurable so that at anytime the manager can add, modify or remove one or more sub-modules, to take account of each evolution of the network at the level of the quality of service management tools 7 and the traffic engineering tools 11 and 12.

The device as described above is essentially a monitoring module 3 integrating the database 9. This configuration is merely one option. The monitoring module of the device of the invention can include only the validation interface and the conversion and configuration modules, in which case the database is independent of the monitoring module, although it is coupled to it.

Also, the converter modules 5 and 10, the configuration module 8 and the validation interface 4 of the device can take the form of electronic circuits (hardware), data processing modules (software), or a combination of hardware and software.

The invention also provides a method of monitoring service data for controlling traffic engineering tools 11 and 12 and delivered by quality of service management tools 7 of a communications network.

This method can be implemented by the device described above. Because the main and optional functions and sub-functions provided by the steps of the method are substantially identical to those provided by the various means constituting the device, only the steps implementing the main functions of the method of the invention are described hereinafter.

The method consists, firstly, of providing rules that are each defined by one or more conditions representative of an event in the network associated with one of the traffic engineering modules 11 and 12 and one or more actions representative of one or more commands to be executed by the associated module and, secondly, of receiving service data designating an event, selecting one or more of the rules corresponding to that event, and then delivering each command representative of the action associated with the condition representative of the event to the traffic engineering module 11 or 12 that is associated with that event in the selected rule.

If the service data is delivered by the management modules 7 in heterogeneous formats, the method, which can function automatically or semi-automatically, advantageously includes a phase of converting service data into events with a single main format (service and network information model).

It can also include a phase of converting actions associated with extracted rules into command(s) and/or request(s) that can be interpreted by the associated traffic engineering module 11 or 12.

Thanks to the invention, the network manager has only one tool to supervise. Because the manager does not need to be familiar with the commands and types of messages specific to the various traffic engineering tools and quality of service management tools, he can devote his attention to traffic supervision, which can even be limited to (re)configuration of the converter modules and the database, if operation is entirely automated.

Consequently, events are processed much quicker, which is of benefit as much to the operator as to his customers.

Moreover, this significantly reduces the time needed to integrate a new management or traffic engineering tool into the network.

Furthermore, the invention enables addition of new software or hardware, potentially generating new events, at any time, without it being necessary to modify the other components.

Finally, the invention applies to a wide variety of data exchange networks, and in particular IP, ATM and Frame Relay networks, and to many types of services, and in particular IP VPN, high bit rate (for example ADSL access), web, multimedia and 3G services.

The invention is not limited to the embodiments of methods and devices described hereinabove by way of example only, but encompasses all variants within the scope of the following claims that the person skilled in the art might envisage.

What is claimed is:

1. A device for monitoring service data for controlling traffic engineering modules and delivered by management modules of a communications network, comprising:
    a memory for storing rules each defined by one or more conditions representative of an event in the network associated with one of said traffic engineering modules and one or more actions representative of one or more commands to be executed by said associated module; and
    monitoring means adapted, on receiving service data designating an event, to extract from said memory one or more of the rules corresponding to said event and to deliver each command representative of an action associated with a condition representative of said event to said traffic engineering module associated with that event in the extracted rule,
    wherein said monitoring means are coupled to a server of said network, and
    wherein said rules are associated in said memory with a validation parameter adapted to assume a first state corresponding to validation without authorization from an operator controlling said server or a second state corresponding to validation subject to authorization by said operator.

2. A device according to claim 1, wherein said monitoring means comprises interface means adapted, on receiving an action to be executed associated with a validation parameter in a second state, to send said action and a request for authorization to execute it to said server and, on receiving an authorization or a refusal of authorization from said server, to authorize or prohibit delivery to the traffic engineering module concerned of each command associated with said action.

3. A device according to claim 2, wherein said monitoring means comprises:
   first converter means adapted to convert said service data delivered by said management modules with different formats into events conforming to a main format;
   second converter means adapted to convert each action associated with an extracted rule into command(s) that can be interpreted by the traffic engineering module associated with said action; and
   configuration means coupled to said memory, to said interface means, and to said first converter means and said second converter means, and adapted, on receiving an event conforming to the main format delivered by said first converter means, to extract from the memory each rule associated with said event, in order to communicate to said second converter means each action associated with each extracted rule, where applicable after a request for authorization via said interface means.

4. A method of monitoring service data for controlling traffic engineering modules and delivered by management modules of a communications network, comprising:
   providing rules each defined by one or more conditions representative of an event in the network associated with one of said traffic engineering modules and one or more actions representative of one or more commands to be executed by said associated module and
   receiving service data designating an event, selecting one or more of the rules corresponding to said event, and delivering each command representative of the action associated with the condition representative of said event to said traffic engineering module associated with said event in the selected rule,
   wherein said rules are associated with a validation parameter adapted to assume a first state corresponding to validation without authorization by an operator or a second state corresponding to validation subject to authorization by said operator.

5. A method according to claim 4, wherein on receiving an action to be executed associated with a validation parameter in a second state, the operator is sent said action and a request for authorization to execute it and, on receiving an authorization or a refusal of authorization from said operator, delivery of each command associated with said action to the traffic engineering module concerned is authorized or refused.

* * * * *